Dec. 12, 1967            H. G. ROHS           3,357,077
MEANS FOR CLAMPING RELATIVELY SLIDABLE MACHINE
TOOL MEMBERS TO EACH OTHER
Filed Sept. 14, 1966

Inventor.
Hans Günther Rohs
By:
Attorney

United States Patent Office 3,357,077
Patented Dec. 12, 1967

3,357,077
MEANS FOR CLAMPING RELATIVELY SLIDABLE MACHINE TOOL MEMBERS TO EACH OTHER
Hans G. Rohs, 9 Richard Wagnerstrasse,
7324 Rechberghausen, Germany
Filed Sept. 14, 1966, Ser. No. 579,415
Claims priority, application Germany, Sept. 16, 1965, B 83,764
4 Claims. (Cl. 29—1)

---

ABSTRACT OF THE DISCLOSURE

For clamping a slide to a dove-tailed guideway in a machine, a clamping shoe is interposed between one side surface of the guideway and the opposed side surface of the slide; and an O-ring sealing member is mounted in a groove between said opposed side surface of the slide and the abutting surface of the shoe. A duct communicates with the portions of the abutting surfaces surrounded by the O-ring. A hydraulic pressure fluid is supplied by this duct to such portions to clamp the slide to guideway. When the hydraulic fluid is exhausted, the slide is released. To adjust the clearance between slide and guideway the shoe is wedge-shaped and is adjusted longitudinally.

---

Figure 1:
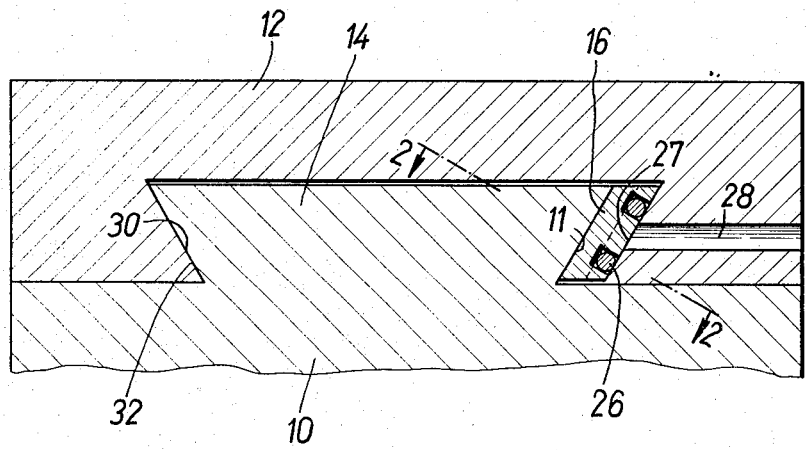

My invention relates to improved means for clamping relatively slidable members of a machine tool to each other. Such members may be formed by a base member provided with a guideway and by a slide member mounted on the guideway for relative movement. By clamping the members to each other, they are held in fixed relative position. That may be desirable, for instance, for preventing any relative displacement of the members under the influence of forces acting thereon. Such relative displacement would impair the accuracy of operation of the machine tool. In a planing machine, for instance, the support carrying the planing tool is formed by a slide movably mounted on a transverse base member. Intermittent feed motion is imparted to the slide. In a planing machine of this type it is common practice to clamp the slide supporting the tool to the transverse tool member temporarily during the performance of the cutting stroke by the carriage carrying the work-piece. The clamp is released after any cutting stroke for the next feed movement. Owing to the clamping of the slide to the base member, the planing tool will be rigidly and non-displaceably held in position during the cutting stroke.

More particularly, my invention relates to hydraulic means for clamping the slide member to the base member.

It is an object of my invention to provide improved clamping means of this type which are greatly simplified by the elimination of cylinder and piston or of expandable tubular elements or diaphragms or the like which have been used heretofore. More particularly, it is an object of my invention to provide improved clamping means of the character described hereinabove which require a minimum of space and are composed of a small number of elements.

Further objects of my invention will appear from a detailed description of a preferred embodiment thereof with reference to the accompanying drawings. It is to be understood, however, that such detailed description serves the purpose of explaining rather than that of limiting or restricting my invention which is in no way limited to the details of such embodiment but is capable of numerous modifications within the scope of the appended claims.

Figure 2:
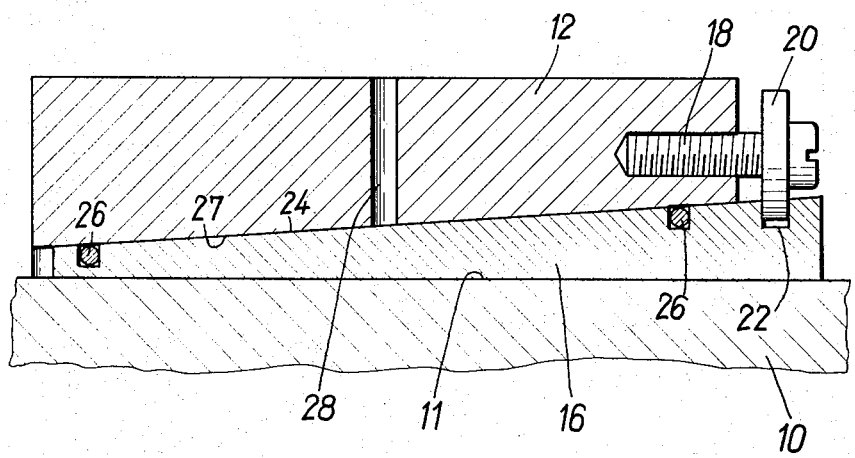

In the drawings:

FIG. 1 represents a transverse section taken through a base member provided with a guideway and a slide member mounted thereon for relative movement, FIG. 2 represents a partial sectional view, the section being taken along the plane 2—2 of FIG. 1, FIG. 2 being on an enlarged scale.

A base member 10 of a machine tool is provided with a guideway 14 of dovetail cross-section and a slide member 12 is mounted on the guideway 14 for relative movement. The guideway 14 is formed with a pair of spaced parallel opposite surfaces 11 and 32 inclined towards each other. The slide member 12 is provided with internal surfaces 30 and 27 coordinated to the surfaces 11 and 32 so as to be complementary thereto. A clamping shoe 16 is interposed between the surface 11 of the guideway 14 and the surface 27 of the slide member 12. This clamping shoe 16 is connected to one of the members, preferably to the slide member 12, by suitable coupling means for common relative movement lengthwise of the guideway 14. In the embodiment shown these coupling means is of a type affording relative adjustment between the shoe 16 and the slide member 12 lengthwise of the guideway. For this purpose the slide member 12 is provided with a threaded bore engaged by a threaded bolt 18 provided with a head 20. This head engages a transverse groove 22 of the clamping shoe 16.

Preferably the clamping shoe 16 is formed by a wedge. For this purpose the internal surface 27 of the slide member 12 forms an acute angle with the opposed surface 11. Therefore, any adjustment of the wedge-shaped clamping shoe 16 relative to the slide member 12 in the longitudinal direction of the latter by means of the threaded bolt 18 will vary the clearance between the guideway 14 and the slide 12.

The internal face 27 of the slide member 12 and the abutting face 24 of the clamping shoe 16 are provided with an outer seal surrounding substantial portions of said faces. For this purpose, one of these faces, for instance the face 24 of the clamping shoe 16, is provided with an endless groove accommodating an O-sealing ring 26. This groove surrounds substantial portions of the faces 24 and 27 and one of these portions is provided with a port communicating with a hydraulic duct 28. By suitable valve means (not shown) a fluid under pressure may be admitted to the duct 28. When this fluid enters between the abutting faces 24 and 27, it will urge the shoe 16 away from the internal surface 27 of the slide member 12 and will thus clamp the shoe 16 against the surface 11 of the guideway 14. As the portions of the surfaces 24, 27 which are surrounded by the sealing ring 26 are of considerable size, the fluid under pressure will exert a considerable force upon the shoe 26. The reactionary pressure produced between the surface 32 of the guideway 14 and the complementary surface 30 of the slide 12 will produce a considerable clamping effect clamping the slide 12 rigidly to the base member 10.

From the above it will be understood that the O-ring 26 is disposed in a groove which is provided in the surface 24 and embraces a region in which the duct 28 terminates. When the fluid under pressure is supplied to the duct 28, it will enter between the abutting surfaces 24 and 27 within the area surrounded by the sealing ring 26. This, therefore, will produce a considerable force which acts on the surface 27 of the slide member 12 and will press the slide member towards the right with reference to FIG. 1 thereby clamping the surfaces 30 and 32 upon each other. The clamp may be released preparatory to any relative movement of members 10 and 12 by so actuating a suitable valve as to connect the duct 28 with exhaust to thereby discharge the fluid under pressure from between the abutting surfaces 24 and 27.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a machine tool, a base member provided with a guideway, a slide member mounted on said guideway for relative movement, and means for clamping said members to each other, said means comprising a clamping shoe interposed between said members, coupling means for connecting said clamping shoe to one of said members for common relative movement lengthwise of said guideway, said shoe being slidable on the other one of said members, the abutting faces of said shoe and of said one of said members being provided with an outer seal surrounding substantial portions of said faces, at least one of said portions being provided with a port for connection with a source of fluid under pressure.

2. The combination claimed in claim 1 in which said clamping shoe is formed by a wedge, said coupling means being of a type affording relative adjustment between said wedge and said one of said members to thereby adjust the clearance in said guideway, said guideway having a dovetail cross-section.

3. The combination claimed in claim 1 in which said seal is formed by an O-ring, one of said faces being provided with an endless groove for accommodation of said ring, said groove surrounding said portions of said faces.

4. In a machine tool, the combination comprising a base member formed with a guideway of dovetail cross-section, said guideway being formed with a pair of spaced parallel opposite surfaces inclined towards each other, a slide member mounted on said guideway for relative movement and being provided with internal surfaces complementary to said first mentioned surfaces, a wedge-shaped clamping shoe inserted between one of said first mentioned surfaces of said guideway and the coordinated one of said complementary surfaces of said slide member, means for adjustably connecting said shoe to said slide member for relative adjustment lengthwise of said guideway, one of the abutting surfaces of said shoe and of said slide member being provided with an endless groove and O-sealing ring inserted in said groove, and means for admitting a fluid under pressure between said abutting surfaces at a point surrounded by said groove.

No references cited.

RICHARD H. EANES, JR., *Primary Examiner.*